(12) United States Patent
Gupta

(10) Patent No.: US 8,494,574 B2
(45) Date of Patent: *Jul. 23, 2013

(54) SYSTEM AND METHOD FOR CONTROLLING A FEATURE OF A TELECOMMUNICATIONS DEVICE BASED ON THE BODY TEMPERATURE OF A USER

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 924 days.

This patent is subject to a terminal disclaimer.

(21) Appl. No.: 12/258,099

(22) Filed: Oct. 24, 2008

(65) Prior Publication Data

US 2010/0105423 A1    Apr. 29, 2010

(51) Int. Cl.
*H04M 1/00* (2006.01)
(52) U.S. Cl.
USPC ............. 455/550.1; 455/90.1; 455/404.2; 455/100; 340/586; 340/426.17; 340/539.12; 340/539.13; 340/573.1; 713/300; 713/320; 713/323

(58) Field of Classification Search
USPC ...................................... 455/550.1
See application file for complete search history.

(56) References Cited

U.S. PATENT DOCUMENTS

| | | | |
|---|---|---|---|
| 5,337,342 A | | 8/1994 | Kruger et al. |
| 5,712,911 A | * | 1/1998 | Her .................. 379/388.01 |
| 5,917,424 A | * | 6/1999 | Goldman et al. ......... 340/7.22 |
| 6,367,020 B1 | | 4/2002 | Klein |
| 6,418,536 B1 | | 7/2002 | Park |
| 6,560,466 B1 | * | 5/2003 | Skorko ....................... 455/567 |
| 6,650,322 B2 | | 11/2003 | Dai et al. |
| 6,735,433 B1 | * | 5/2004 | Cervantes ................ 455/417 |
| 6,821,249 B2 | | 11/2004 | Casscells et al. |
| 6,970,080 B1 | | 11/2005 | Crouch et al. |
| 6,987,454 B2 | | 1/2006 | Narayanaswami et al. |
| 7,010,710 B2 | | 3/2006 | Piazza |
| 7,076,268 B2 | * | 7/2006 | Blacklock et al. ......... 455/550.1 |
| 7,248,853 B1 | | 7/2007 | Sakarya |
| 7,251,233 B2 | * | 7/2007 | Wood ......................... 370/338 |
| 7,342,491 B2 | | 3/2008 | Fujisawa et al. |
| 7,353,413 B2 | | 4/2008 | Dunstan |
| 7,567,659 B2 | | 7/2009 | Kumagai |
| 7,844,677 B1 | | 11/2010 | Asher et al. |
| 8,363,791 B2 | | 1/2013 | Gupta et al. |
| 2001/0024949 A1 | | 9/2001 | Yanagida et al. |
| 2001/0031633 A1 | * | 10/2001 | Tuomela et al. ............... 455/417 |
| 2002/0072348 A1 | | 6/2002 | Wheeler et al. |
| 2003/0051179 A1 | | 3/2003 | Tsirkel et al. |
| 2003/0128114 A1 | | 7/2003 | Quigley |
| 2003/0179094 A1 | | 9/2003 | Abreu |
| 2004/0073827 A1 | | 4/2004 | Tsirkel et al. |

(Continued)

OTHER PUBLICATIONS

U.S. Appl. No. 12/258,133; Non Final Office Action dated Feb. 1, 2012; 19 pages.

(Continued)

*Primary Examiner* — Nimesh Patel
(74) *Attorney, Agent, or Firm* — Swanson & Bratschun, L.L.C.

(57) ABSTRACT

A method for controlling a feature of a telecommunications device includes determining a proximity of a user to the telecommunications device by detecting the body heat of the user. In response to determining proximity of the user, a feature of the telecommunications device is toggled between an activated state and a deactivated state.

15 Claims, 4 Drawing Sheets

U.S. PATENT DOCUMENTS

| | | | |
|---|---|---|---|
| 2005/0083195 A1 | 4/2005 | Pham et al. | |
| 2005/0181838 A1* | 8/2005 | Matsuda et al. | 455/567 |
| 2005/0208925 A1 | 9/2005 | Panasik et al. | |
| 2005/0221791 A1* | 10/2005 | Angelhag | 455/343.5 |
| 2006/0135139 A1* | 6/2006 | Cheng et al. | 455/418 |
| 2006/0140452 A1 | 6/2006 | Raynor et al. | |
| 2007/0032218 A1 | 2/2007 | Choi | |
| 2007/0032225 A1* | 2/2007 | Konicek et al. | 455/417 |
| 2007/0180282 A1 | 8/2007 | Kim | |
| 2008/0014989 A1* | 1/2008 | Sandegard et al. | 455/557 |
| 2008/0018480 A1 | 1/2008 | Sham | |
| 2008/0081646 A1 | 4/2008 | Morin et al. | |
| 2008/0158000 A1 | 7/2008 | Mattrazzo | |
| 2008/0304630 A1 | 12/2008 | Nguyen et al. | |
| 2009/0160541 A1 | 6/2009 | Liu et al. | |
| 2009/0254313 A1 | 10/2009 | Armour et al. | |
| 2009/0323919 A1* | 12/2009 | Toner et al. | 379/211.02 |
| 2010/0105427 A1* | 4/2010 | Gupta | 455/556.1 |
| 2010/0250985 A1* | 9/2010 | Gupta | 713/323 |
| 2012/0198260 A1 | 8/2012 | Gupta | |

OTHER PUBLICATIONS

U.S. Appl. No. 12/258,133; Final Rejection dated Jun. 8, 2011; 21 pages.

U.S. Appl. No. 12/258,133; Non-Final Rejection dated Dec. 28, 2010; 16 pages.

U.S. Appl. No. 12/415,067; Notice of Allowance dated Apr. 2, 2012; 5 pages.

U.S. Appl. No. 12/415,067; Notice of Allowance dated Jan. 9, 2012; 5 pages.

U.S. Appl. No. 12/415,067; Non-Final Rejection dated Sep. 9, 2011; 13 pages.

U.S. Appl. No. 12/258,133; Final Rejection dated Jul. 10, 2012; 20 pages.

U.S. Appl. No. 12/258,133; Notice of Allowance dated Mar. 15, 2013; 25 pages.

\* cited by examiner

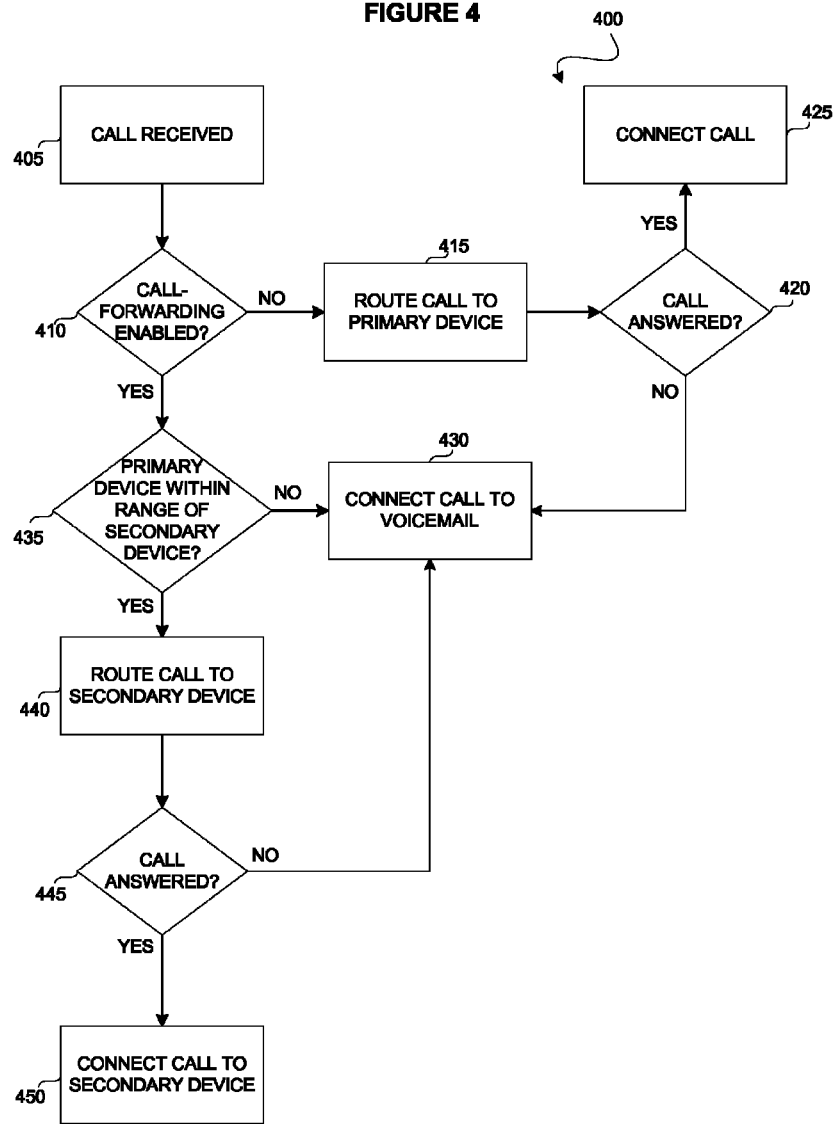

US 8,494,574 B2

SYSTEM AND METHOD FOR CONTROLLING A FEATURE OF A TELECOMMUNICATIONS DEVICE BASED ON THE BODY TEMPERATURE OF A USER

BACKGROUND OF THE INVENTION

Telecommunications devices frequently include advanced features, such as call-forwarding, that may be toggled between an activated and deactivated state by a user. However, manually toggling features between an activated and deactivated state can be tedious. Moreover, users frequently forget to toggle such features to an optimal state.

SUMMARY OF THE INVENTION

According to an illustrative embodiment, a method for controlling a feature of a telecommunications device comprises determining a proximity of a user to the telecommunications device by detecting the body heat of the user, and in response to determining proximity of the user, toggling a feature of the telecommunications device between an activated state and a deactivated state.

BRIEF DESCRIPTION OF THE DRAWINGS

FIG. 4 is a flow diagram of an illustrative process for routing a call based on the body temperature of a user.

DETAILED DESCRIPTION OF THE DRAWINGS

While the systems and methods are described with reference to several illustrative embodiments described herein, it should be clear that the present invention should not be limited to such embodiments. Therefore, the description of the embodiments provided herein is illustrative of the present invention and should not limit the scope of the invention as claimed.

Figure 1:
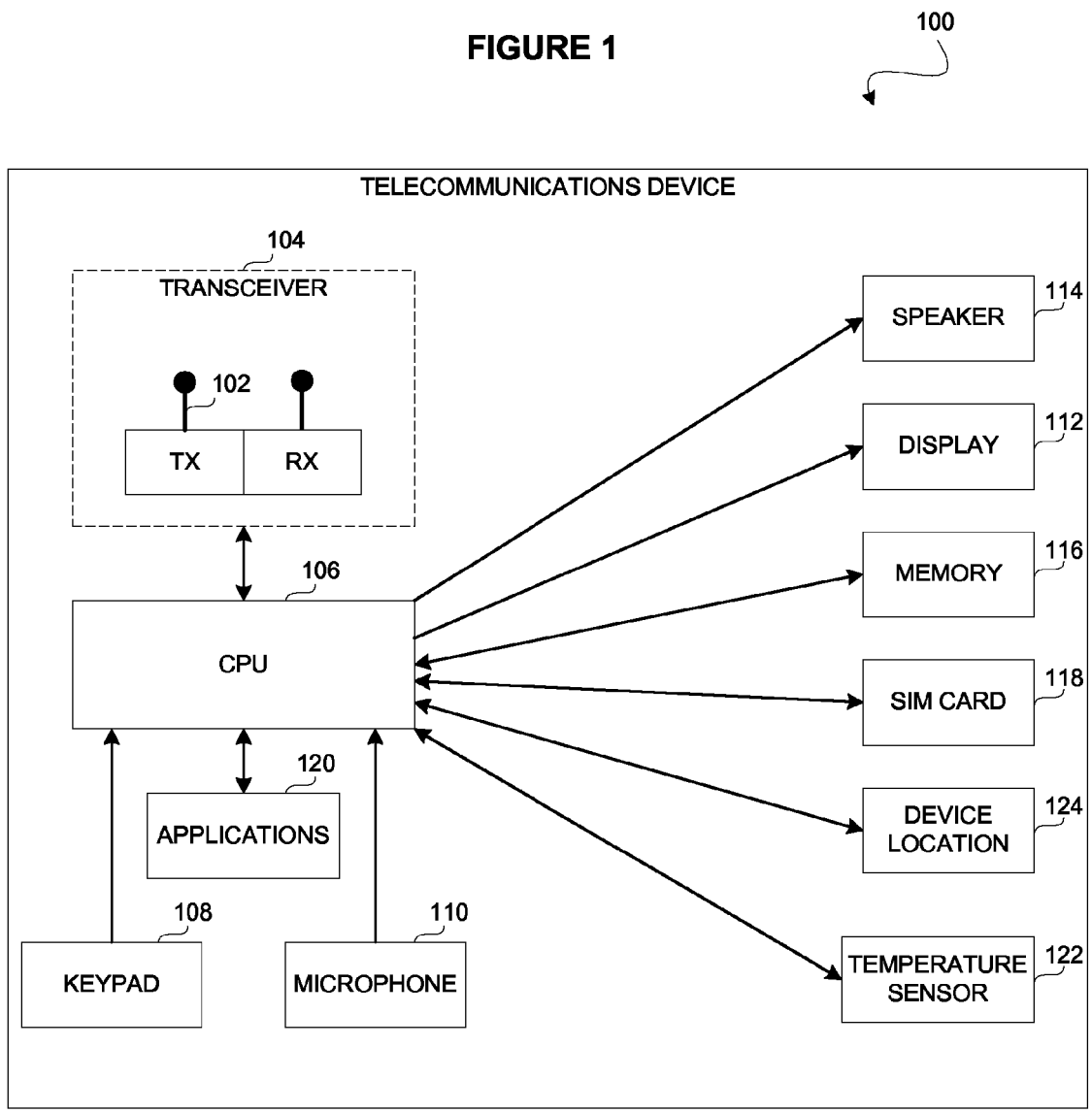
FIG. 1 is an illustration of a telecommunications device capable of detecting the body temperature of a user.

FIG. 1 shows a block diagram of an illustrative embodiment of a telecommunications device 100. The telecommunications device 100 may be any suitable telecommunications device, including, but not limited to, standard analog telephones, cordless telephones, VoIP telephones, DECT telephones, smart telephones or wireless devices, such as cellular telephones, personal digital assistants (PDA), communications enabled mp3 players, etc. The telecommunications device 100 has one or more internal or external antennas 102 for receiving and transmitting electromagnetic signals such as radio frequency signals. A transceiver 104 is connected to the antenna(s) 102 and typically provides modulation and demodulation of the transmitted and received signals, respectively. A processor unit 106 is connected to the transceiver 104 and may comprise a signal processor, microprocessor, ASIC, or other control and processing logic circuitry. The processor unit 106 may perform signal coding, data processing, input/output processing, power control, and other functions necessary for implementing a telecommunications device. The processor 106 may be powered by a battery, the body heat of a user, movement by the user, or the like. A customer may provide input to the processor unit 106 via a keypad 108, a microphone 110, or a display/touchpad 112. In turn, the processor unit 106 may provide information to the customer via the display/touchpad 112 or a speaker 114.

The processor unit 106 may access information from, and store information in, a nonremovable memory 116 or a removable memory 118. The nonremovable memory 116 may consist of RAM, ROM, a hard disk, or other well-known memory storage technologies. The removable memory 118 may consist of Subscriber Identity Module (SIM) cards, which are well known in GSM communication systems, or other well-known memory storage technologies, such as "smart cards." Applications 120, including call-forwarding applications, wireless content browser applications, and address book applications, could be implemented in either the removable memory 118 or the nonremovable memory 116. While the illustrative embodiment is shown in the context of a GSM telecommunications device, it will be appreciated that the principles of the present embodiment are equally applicable to CDMA telecommunications devices and any other suitable telecommunications device or devices.

The telecommunications device 100 also includes a temperature sensor 122 configured to detect the body heat of a user to determine the proximity of the user relative to the device 100. The temperature sensor 122 may be any suitable device capable of detecting the body heat of a user, including, but not limited to, a sensor, thermocouple, resistance thermometer, thermistor, thermometer, IR thermometer, etc. As will be discussed in greater detail below, the processor unit 106 may toggle a feature of the device 100 between an activated and deactivated state based on whether or not a user's body heat has been detected by the temperature sensor 122.

The sensor 122 and processor 106 may be configured to determine that a user is in relatively close proximity to the device 100 in any number of ways and either activate or deactivate a feature of the device 100. For example, if a temperature is detected that is within a predetermined range, it may be determined that a user is in close proximity to the device 100, but if a temperature is below the predetermined range, it may be determined that a user is not in close proximity to the device 100. Alternatively, if a temperature is detected that is a predetermined amount above the ambient temperature, it may be determined that a user is in close proximity to the device 100; however, if a detected temperature is below the aforementioned predetermined amount, it may be determined that a user is not in close proximity to the device 100. In either case, if it is determined that a user is in close proximity to the device 100, the device 100 may be activated and one or more features of the device 100, such as call-forwarding, may be deactivated; however, if it is determined that a user is not in close proximity to the device 100, the device 100 may be deactivated and one or more features of the device, such as call-forwarding, may be activated. Nevertheless, it will be appreciated that the inverse of the above may be employed as well. For example, if it is determined that the user is in close proximity to the device, a feature, such as a vibrate function, may be activated, and, optionally, a ring function deactivated. Conversely, if it is determined that the user is not in close proximity to the device, a features, such a ring function, may be activated, and, optionally, a vibrate function deactivated. Additionally, it will be appreciated that "close proximity", as used herein, is a relative term and that the temperature sensor 122 and processor 106 may be configured to have any suitable sensitivity. For example, the processor 106 and sensor 122 may be configured such that a user's body heat is only detected if the device 100 is touching the user's skin, in the user's pocket, or clipped to a user's belt. Alternatively, the processor 106 and sensor 122 may be configured such that a user's body heat is detected if the user is within a predetermined radius of the device 100 (e.g., 1-ft., 3-ft., 5-ft., etc.).

The device 100 may also include a device location component 124 which allows the location of the device 100 to be known to the wireless service provider, so that the wireless service provider can use this information (or pass it along) for the purpose of locating the device 100 and/or locating an alternative device in the vicinity of the device 100. For example, the location component 124 may be a global positioning system (GPS) device that is able to identify location coordinates from the one or more GPS satellites. However, it will be appreciated that the location component 124 may be any suitable device that is capable of providing location information to the wireless service provider.

Unless described otherwise herein, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 based on the detailed description provided herein.

Figure 2:
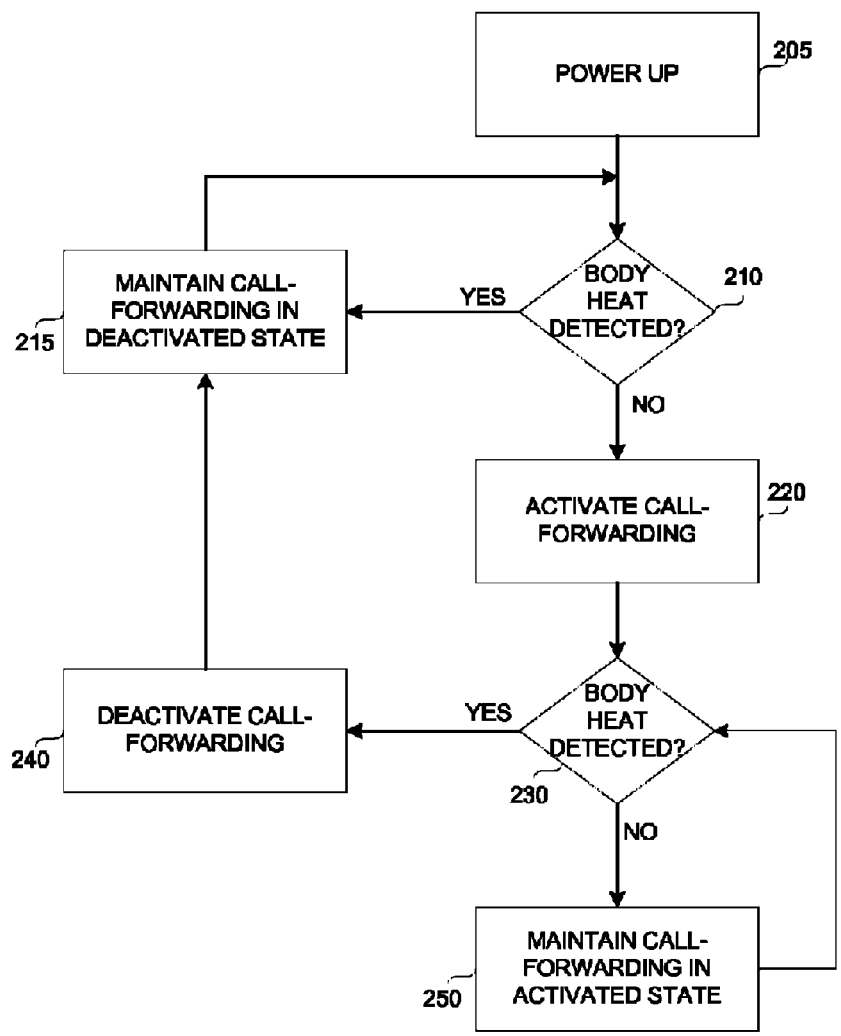
FIG. 2 is a flow diagram of an illustrative process for controlling a feature of a telecommunications device based on the body temperature of a user.

FIG. 2 is a flow chart of an illustrative process 200 for controlling one or more features of a telecommunications device. The process begins by powering the telecommunications device on (step 205). While the telecommunications device is on, the device determines whether the user is in close proximity to the device based on whether or not the user's body heat has been detected (step 210). In one embodiment, the temperature detected by a thermometer or other temperature sensing device is compared to a known ambient temperature of the location of the telecommunications device to determine the proximity of a user. Such ambient temperature may be a known ambient internal temperature taken from a thermostat or separately measured temperature reading or a known ambient external temperature taken from a locally known weather temperature reading or otherwise established temperature reading. If the user's body heat has been detected, the device may maintain one or more features in a deactivated state (step 215) and continue to determine whether the user remains in close proximity to the device via detecting the user's body heat (step 210). The device may continuously measure or scan for a user's body heat or intermittently measure or scan for a user's body heat.

If the body heat of the user is not detected, it may be determined that the user is not in close proximity to the device and one or more features of the device, such as call-forwarding, may be activated (step 220). Any suitable feature may be activated if it is determined that the user is not in close proximity to the device. For example, in the illustrative embodiment, a call-forwarding feature may be activated if it is determined that the user is not in close proximity to the device. Other suitable features that may be activated if it is determined that the user is not in close proximity, include, but are not limited to, a ring function (e.g., SIM ring, sequential ring, etc.), voicemail, sleep-mode or reduced-power mode, find-me-follow-me, selective rejection, selective acceptance, etc. Also, it will be appreciated that any suitable feature may be activated if a user's body heat is detected and deactivated if a user's body heat is not detected (e.g., a vibrate function). Moreover, in an alternative embodiment, a call-forwarding feature, or any of the aforementioned features, may be activated when the body heat of a user is detected.

Once the feature has been activated (step 220), the device may continue to, either continuously or intermittently, measure or scan for a user's body heat (step 230). So long as a user's body heat is not detected, the feature may remain in an activated state (step 250). However, if a user's body heat is detected, the feature may be deactivated (step 240) and maintained in a deactivated state (step 215) until the user's body heat is again undetected. In either case, the device will continue to measure or scan for a user's body heat thereafter (step 210 or step 230).

Figure 3:
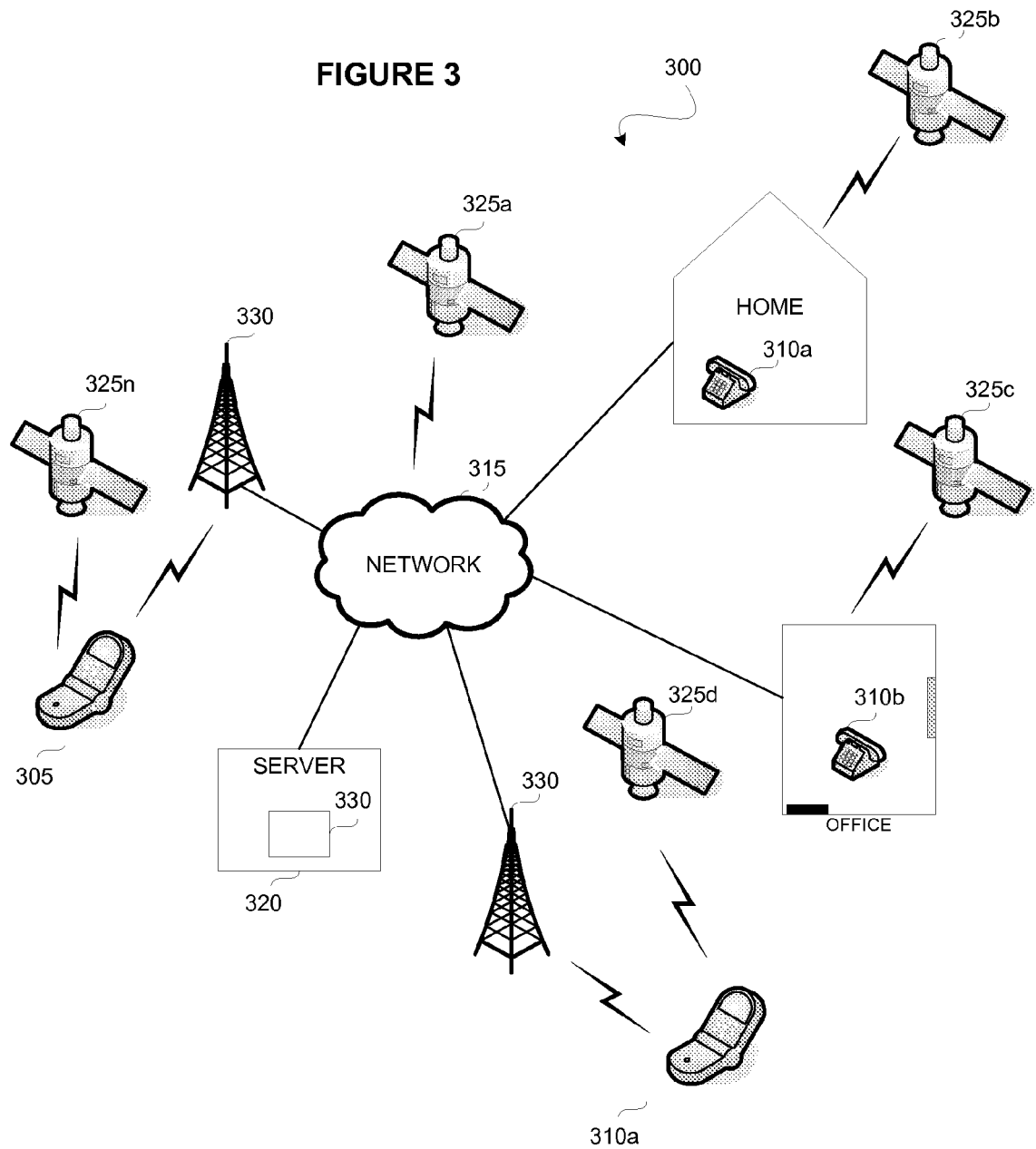
FIG. 3 is an illustration of a telecommunications network employing a device capable of detecting the body temperature of a user.

Referring now to FIG. 3, a system 300 employing a primary, body-heat sensing telecommunications device 305 is shown. The primary telecommunications device 305 is configured to detect a user's body heat, and either activate a call-forwarding feature if or when user's body heat is not detected or deactivate a call-forwarding feature if or when a user's body heat is detected. As used herein, the term "call-forwarding" refers to any function whereby a call to a primary telecommunications device is forwarded to at least one other secondary telecommunications device, and includes, but is not limited to, a conventional call-forwarding function, a "find-me follow-me" function, a simultaneous (SIM) ringing function, a sequential ringing function, etc. Moreover, while the present embodiment is described with reference to a call-forwarding feature, it will be appreciated that such a feature is used for illustrative purposes only and that any suitable feature may be toggled between and activated and deactivated state based on whether or not a user's body temperature is detected.

The system 300 may also include one or more secondary telecommunications devices 310a-310n (collectively 310), a communications network 315, a network server 320 and one or more GPS satellites 325a-325n (collectively 325). The different elements and components of the system 300 may communicate with one another using wireless communications or hardwired connections, such as fiber optics, cable, DSL, telephone lines, and other similar connections. In the illustrative embodiment, the primary telecommunications device 305 and at least one of the secondary telecommunications devices 310 are wireless and may communicate with the network(s) 315 via one or more mobile communications towers 335. While the illustrative embodiment shows the devices 305, 310 as being wireless, it will be appreciated that the system 300 may be employed with any type of telecommunications device and is not limited to employing at least one wireless telecommunications device.

The communications network 315 may include any number of networks capable of providing communications between the telecommunications devices 305, 310, server 320, and GPS satellite(s) 325. For example, the communications network may be one or more, or any combination of, wireless networks, data or packet networks, publicly switched telephone networks (PSTN), or any other suitable networks.

The one or more primary telecommunications devices 305 and one or more secondary telecommunications devices 310 may be configured to determine or be utilized in determining location information. For example, the devices 305, 310 may be configured with a global positioning system (GPS) device that is able to identify location coordinates from the one or more GPS satellites 325; the coordinates may then be communicated, via the network 315, to the server 320. Alternatively, the devices may utilize triangulation techniques for determining the location of the devices which may then be communicated to the server 320. Thus, it should be understood that GPS coordinates may be but one location coordinate system and that alternative location coordinates may be utilized to determine the location of the devices.

The network server 320 may be any server or device configured to process commands from the primary telecommunications device 305 and to facilitate communications between the device 305, the satellites 325, secondary devices 310 and outside callers. The primary device 305 may communicate to the server 320 that the device is in a call-forwarding mode. Alternatively, the primary device 305 may communicate detected temperature information to the server 320 whereby the server determines whether the device 305 should be in a call-forwarding mode based on the temperature information. The server 320 may include one or more software modules 330, whereby, when the call-forwarding feature of the device 305 is activated because the user's body heat has not been detected by the device 305 and an incoming call from an outside caller is received, the server 320 may attempt to locate the primary device 305 as well as a secondary device 310 within a predetermined range (e.g., 10-ft.) of the primary device 305 via one or more GPS satelites 325. If or when a suitable secondary device 310 has been located, the incoming call may be forwarded to the secondary device 310. The secondary device(s) 310 may be any telecommunications device within a predetermined range of the primary device 305. Alternatively, a predetermined list of secondary device(s) 310 may be stored in the server 320 such that when the call-forwarding feature of the primary device 305 is active, the server 320 attempts to determine if the primary device 305 is in close proximity to one of the predetermined secondary devices 310 and, if so, forwards the call thereto. For example, a predetermined list of secondary telecommunications devices 310 may include a home phone, an office phone, a spouse or sibling's wireless device, etc. However, if a suitable secondary device 310 is not located in an appropriate amount of time or the primary device 305 is not within range of a predetermined secondary device 310, the incoming call may be forwarded to voicemail associated with the primary device 305.

FIG. 4 is a flow chart of an illustrative process 400 for routing a telephone call intended for a primary telecommunications device based on a user's detected body temperature. The process begins by receiving an incoming telephone call from a calling party intended for the primary telecommunications device (step 405). Next, a determination may be made as to whether a call-forwarding feature of the primary telecommunications device is activated (step 410). In the illustrative embodiment, the call-forwarding feature may be in an activated state if the user's body heat has not been detected and may be in a deactivated state if the user's body heat has been detected.

If the call-forwarding feature is in a deactivated state, the call may be routed to the primary telecommunications device (step 415). If the call is answered (step 420), the call may be connected to the primary telecommunications device (step 425). However, if the call is not answered (step 420), the call may connected to voicemail associated with the primary telecommunications device (step 430).

If, however, the call-forwarding feature of the primary telecommunications device is in an activated state, a determination may be made as to whether a suitable secondary telecommunications device is within a predetermined range of the primary telecommunications device (step 435). The determination may be made by any suitable location-determining means, including, but not limited to, receiving GPS coordinates from the primary and secondary telecommunications devices. A suitable secondary telecommunications device may be any telecommunications device within range of the primary telecommunications device. Alternatively, a suitable secondary telecommunications device may be one in a predetermined list of secondary telecommunications devices associated with the primary telecommunications device, which is also within the predetermined range of the primary telecommunications device. If the primary telecommunications device is not within a predetermined range of a suitable secondary telecommunications device, the call may be connected to voicemail associated with the primary telecommunications device (step 430).

However, if the primary telecommunications device is within a predetermined range of a suitable secondary telecommunications device, the call may be routed to the secondary telecommunications device (step 440). If the call is answered (step 445), the call may be connected to the secondary telecommunications device (step 450). If, however, the call is not answered (step 445), the call may be connected to voicemail associated with the primary device (step 430).

Although the principles of the present invention have been described in terms of the foregoing embodiments, this description has been provided by way of explanation only, and is not intended to be construed as a limitation of the invention. Those skilled in the art will recognize modifications of the present invention.

I claim:

1. A method for controlling a call-forwarding function of a telecommunications device comprising:
    detecting, with the telecommunications device, temperature information based on body heat of a user;
    communicating, with the telecommunications device, detected temperature information;
    receiving, at a network server, the detected temperature information;
    determining, with the network server, that the telecommunications device should be in a call forwarding mode, based on the detected temperature information;
    receiving a telephone call directed to the telecommunications device;
    receiving, with the network server, global positioning system ("GPS") coordinates from the telecommunications device;
    receiving, with the network server, GPS coordinates from a plurality of secondary telecommunications devices;
    determining, based on the received GPS coordinates, whether any secondary telecommunications device is within a predetermined range of the telecommunications device;
    if it is determined that a secondary telecommunications device is within a predetermined range of the telecommunications device, forwarding the telephone call to the secondary telecommunications device that is within the predetermined range of the telecommunications device; and
    if it is determined that no secondary telecommunications device is within a predetermined range of the telecommunications device, forwarding the telephone call to a voicemail system for the telecommunications device.

2. The method of claim 1 wherein the call-forwarding mode is toggled to an activated state when the user's body heat is not detected.

3. The method of claim 1 wherein the call-forwarding mode is toggled to a deactivated state when the user's body heat is detected.

4. The method of claim 2 further comprising:
    storing, at the network server, a list identifying the plurality of secondary telecommunications devices.

5. The method of claim 2 further comprising:
identifying a secondary telecommunications device in close proximity to the telecommunications device.

6. A system, comprising:
a telecommunications device configured to:
   detect temperature information based on body heat of a user; and
   communicate detected temperature information; and
a network server configured to:
   receive the detected temperature information;
   determine that the telecommunications device should be in a call forwarding mode, based on the detected temperature information;
   receive a telephone call directed to the telecommunications device;
   receive global positioning system ("GPS") coordinates from the telecommunications device;
   receive GPS coordinates from a plurality of secondary telecommunications devices;
   determine, based on the received GPS coordinates, whether any secondary telecommunications device is within a predetermined range of the telecommunications device;
   if it is determined that a secondary telecommunications device is within a predetermined range of the telecommunications device, forward the telephone call to the secondary telecommunications device that is within the predetermined range of the telecommunications device; and
   if it is determined that no secondary telecommunications device is within a predetermined range of the telecommunications device, forward the telephone call to a voicemail system for the telecommunications device.

7. The system of claim 6, wherein the call-forwarding mode is toggled to an activated state when the user's body heat is not detected.

8. The system of claim 6, wherein the call-forwarding mode is toggled to a deactivated state when the user's body heat is detected.

9. The system of claim 6, wherein the network server is further configured to:
   store a list identifying the plurality of secondary telecommunications devices.

10. The system of claim 6, wherein the network server is further configured to:
   identify a secondary telecommunications device in close proximity to the telecommunications device.

11. A network server configured to:
   receive detected temperature information, based on body heat of a user, from a telecommunications device;
   determine that the telecommunications device should be in a call forwarding mode, based on the detected temperature information;
   receive a telephone call directed to the telecommunications device;
   receive global positioning system ("GPS") coordinates from the telecommunications device;
   receive GPS coordinates from a plurality of secondary telecommunications devices;
   determine, based on the received GPS coordinates, whether any secondary telecommunications device is within a predetermined range of the telecommunications device;
   if it is determined that a secondary telecommunications device is within a predetermined range of the telecommunications device, forward the telephone call to the secondary telecommunications device that is within the predetermined range of the telecommunications device; and
   if it is determined that no secondary telecommunications device is within a predetermined range of the telecommunications device, forward the telephone call to a voicemail system for the telecommunications device.

12. The system of claim 11, wherein the call-forwarding mode is toggled to an activated state when the user's body heat is not detected.

13. The system of claim 11, wherein the call-forwarding mode is toggled to a deactivated state when the user's body heat is detected.

14. The system of claim 11, wherein the network server is further configured to:
   store a list identifying the plurality of secondary telecommunications devices.

15. The system of claim 11, wherein the network server is further configured to:
   identify a secondary telecommunications device in close proximity to the telecommunications device.

* * * * *